US010960373B2

(12) United States Patent
Tames

(10) Patent No.: US 10,960,373 B2
(45) Date of Patent: Mar. 30, 2021

(54) HYDROGENATION PROCESS

(71) Applicant: Intensichem Group Limited, Sandwich (GB)

(72) Inventor: Oliver Alexander Albert Tames, Sandwich (GB)

(73) Assignee: Intensichem Group Limited, Sandwich (GB)

( * ) Notice: Subject to any disclaimer, the term of this patent is extended or adjusted under 35 U.S.C. 154(b) by 0 days.

(21) Appl. No.: 16/331,641

(22) PCT Filed: Sep. 11, 2017

(86) PCT No.: PCT/GB2017/052646
§ 371 (c)(1),
(2) Date: Mar. 8, 2019

(87) PCT Pub. No.: WO2018/046951
PCT Pub. Date: Mar. 15, 2018

(65) Prior Publication Data
US 2019/0358602 A1    Nov. 28, 2019

(30) Foreign Application Priority Data
Sep. 9, 2016    (GB) ...................... 1615385

(51) Int. Cl.
*B01J 8/02* (2006.01)
*B01J 3/03* (2006.01)
*B01J 10/00* (2006.01)
*B01J 23/44* (2006.01)

(52) U.S. Cl.
CPC ............... *B01J 8/0292* (2013.01); *B01J 3/03* (2013.01); *B01J 10/007* (2013.01); *B01J 23/44* (2013.01); *B01J 2208/00176* (2013.01); *B01J 2208/00539* (2013.01)

(58) Field of Classification Search
None
See application file for complete search history.

(56) References Cited

U.S. PATENT DOCUMENTS

2016/0244402 A1*  8/2016  Pennemann .......... C07C 209/36

FOREIGN PATENT DOCUMENTS

| WO | 2000009647 | 2/2000 |
| WO | 2005107936 | 11/2005 |
| WO | 2013076747 | 5/2013 |
| WO | 2016040661 | 3/2016 |

OTHER PUBLICATIONS

Bryan et al. Beilstein Journal of Organic Chemistry, 2011, 7, 1141-1149.*
Written Opinion and International Search Report dated Mar. 1, 2018 in international application serial No. PCT/GB2017/052646.

* cited by examiner

*Primary Examiner* — Clinton A Brooks
(74) *Attorney, Agent, or Firm* — Haugen Law Firm PLLP

(57) ABSTRACT

The present invention relates to a continuous flow hydrogenation process and process apparatus.

13 Claims, 1 Drawing Sheet

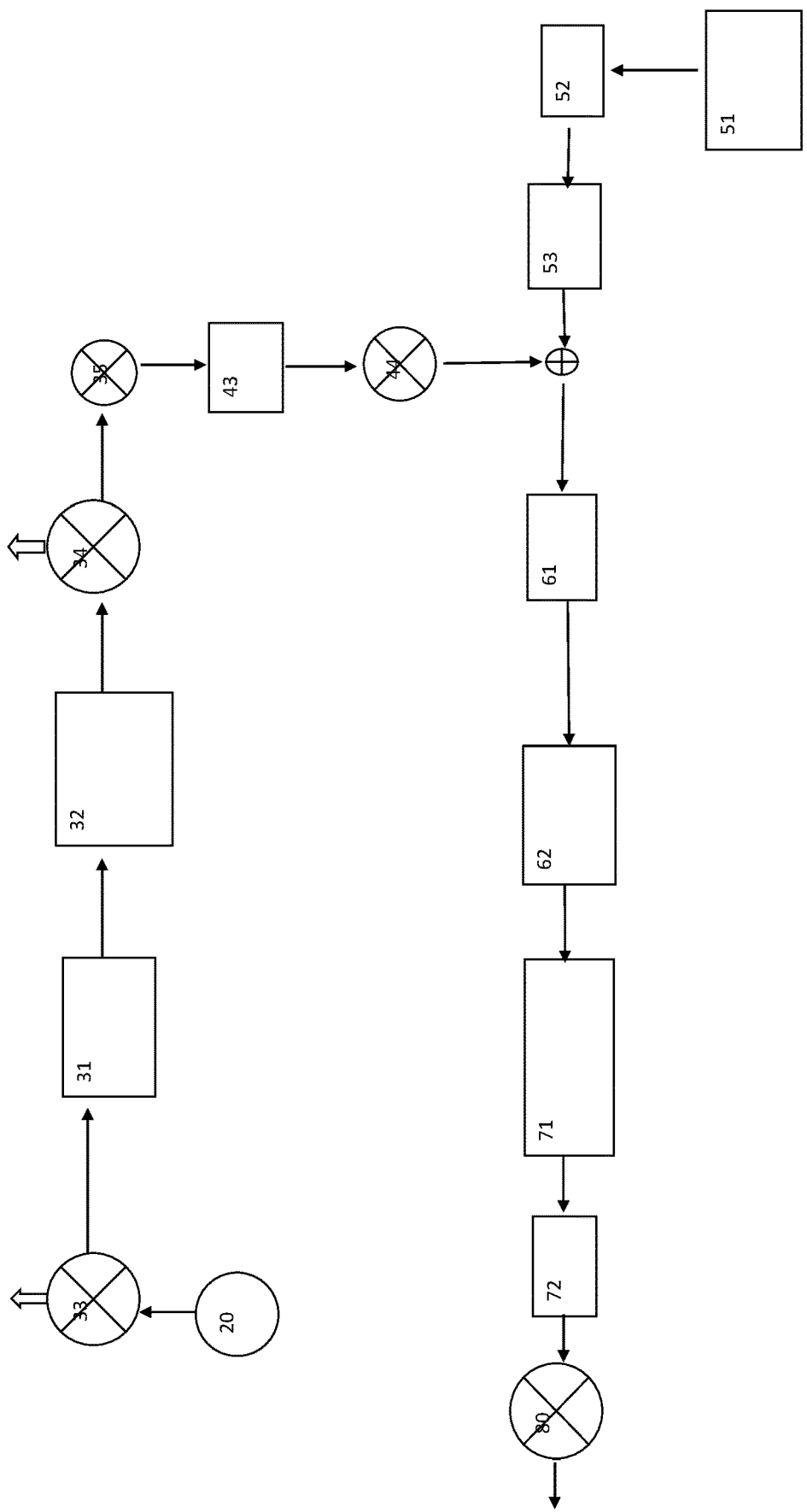

HYDROGENATION PROCESS

The present invention relates to a continuous flow hydrogenation process, and process apparatus.

Hydrogenation is a chemical reaction between molecular hydrogen ($H_2$) and another compound or element, typically in the presence of a catalyst. The process is commonly employed to reduce or saturate organic compounds. Hydrogenating processes (hereinafter, hydrogenation) are widely used in the chemical industry, for example the pharmaceutical industry.

Laboratory scale continuous flow hydrogenation apparatuses are known.

International patent application No. PCT/GB97/01014 published as WO 97/38955 and International patent application No. PCT/GB03/02157 published as WO 03/099743, the contents of which are incorporated in their entirety for all purposes, both disclose a flow-type laboratory scale hydrogenation apparatus and a hydrogenation process using such an apparatus. The apparatuses concerned comprise a reservoir that stores the substance to be hydrogenated or its solution, a feed pump in communication with the reservoir, a mixer connected to the feed pump by one of its inlets, a hydrogen source connected to a further inlet of the mixer through a compressor, a hydrogenation reactor connected to the outlet of the mixer, a heating/cooling means and a pressure reduction unit connected to the outlet of the reactor. A catalyst is arranged within the reactor to effect the hydrogenating reaction. The pressure reduction unit comprises a valve and has at least two outlets. The valve controls the flow rate measured in the reactor, and thereby the pressure within the flow path of the apparatus. The hydrogenation is effected in a carrier medium, which is inert with respect to hydrogenation, at a temperature and pressure such that the carrier medium is a supercritical fluid. An advantage of supercritical hydrogenation when compared to hydrogenation performed under non-supercritical conditions is that hydrogen, which poorly dissolves in non-supercritical organic solvents, is almost completely miscible with supercritical fluids, and hence, by making use of such fluids, an increased amount of hydrogen may be delivered to the reaction site. Accordingly, the apparatuses also comprise a unit to provide the feed of the fluid needed by the supercritical hydrogenation; this unit is connected via its outlet to a third inlet of the mixer. While hydrogenation is taking place in the apparatuses, the sample solution, the fluid and the hydrogen necessary for hydrogenation are all fed into the mixer, and the mixture being formed within the mixer is then passed into the reactor.

The pressure and temperature values within the reactor are such that the mixture is a supercritical fluid. The hydrogenation takes place within the reactor in the supercritical state and the mixture leaving the reactor and containing the reaction product then flows into the pressure reduction unit, wherein by decreasing the pressure, the reaction product is separated from the fluid and is withdrawn via one of the outlets. The fluid and the hydrogen that have not been consumed in the reaction are vented to the surroundings or recycled.

It is a disadvantage of the above apparatuses and processes that hydrogenation performed under supercritical conditions as described in International patent application No. PCT/GB97/01014 published as WO 97/38955 and International patent application No. PCT/GB03/02157 published as WO 03/099743 requires apparatus to generate extremely high pressures and temperatures and control the supercritical fluid. This poses a significant barrier to industrial scale production. It significantly increases the operational risk of the apparatuses, makes the construction and the operation of the apparatuses, as well as the hydrogenating processes, more complicated and significantly increases the production costs. Furthermore, supercritical conditions may fundamentally affect the nature of a solvent, for example its ability to dissolve the compound to be hydrogenated.

International patent application No. PCT/HU2005/000046 published as WO 2005/107936, the contents of which is incorporated in its entirety for all purposes, discloses a flow-type laboratory scale hydrogenation apparatus and a hydrogenation process using such an apparatus. There is described a flow-type laboratory scale hydrogenation apparatus for hydrogenating given samples, comprising a reservoir, a feed pump, a collecting element with two inlets and an outlet, a hydrogenation reactor and a pressure-adjusting unit, all connected into a flow path, as well as a hydrogen source and a valve transmitting a gas stream only into a single direction and connected between the hydrogen source and the second inlet of the collecting element, characterized in that the feed pump is a pump generating a constant volume rate and the reservoir contains at least a solvent, as a base solution, of the sample to be hydrogenated, and wherein the hydrogenation reactor is joined into the flow path via detachable connections and is formed as a replaceable cartridge which contains in its inner space a packing increasing the flow resistance and facilitating the mixing of liquid and gaseous components, and wherein the pressure-adjusting unit is connected into the flow path after the hydrogenation reactor and is provided with an electrically controlled regulation having a control range of a ratio of at least 1:6. The hydrogenation reactor comprises a catalyst necessary for the hydrogenation. An hydrogenation apparatus is described which comprises a plurality of hydrogenation reactors which are connected into the flow path through a switching valve having a multiway construction at least on the inlet side thereof, however, the scale of apparatus is such that it is not suitable for commercial production.

In addition, there are a number of significant barriers to scaling up this laboratory scale apparatus to commercial scale.

Catalytic hydrogenation of an organic compound in the liquid phase may be carried out as a continuous flow process at the commercial scale in a trickle-bed reactor (TBR).

In this context a trickle-bed reactor (TBR) is a chemical reactor that uses the downward movement of a liquid and the downward (co-current) or upward (counter current) movement of gas through a fixed bed of (catalyst) particles while the reaction takes place.

Fixed-bed reactors such as TBRs have long been used in process industries. Typically, they contain catalyst in pellet form, packed in a static bed.

TBRs have been extensively used in the petrochemical industry, for example hydrogenation processes in refineries. However, TBRs do not provide sufficient process control to enable commercial manufacture of sensitive and complex chemical intermediates and products required, for example, in the pharmaceutical industry.

Hydrogenation is an exothermic process. The apparatus described in WO 2005/107936 lacks the thermal control required for industrial scale. Thermal control in the apparatus disclosed in WO 2005/107936 is determined by the fixed surface area of the replaceable cartridge hydrogenation reactor. As the size of the cartridge is increased, the surface area to volume ratio rapidly decreases and as a consequence there is a lack of scalable thermal control.

Although trickle-bed reactors are typically externally cooled, the bulk of the surface area of the catalyst is not in contact with the reactor walls. Thermal control relies on thermal transfer from the catalyst to the liquid phase in order to remove excess heat from the catalyst bed, where reaction occurs.

The aim of the present invention is to provide a continuous hydrogenation process suitable for homogeneous and heterogeneous catalytic hydrogenation at commercial scale with enhanced process control, in particular thermal control, control of hydrogen stoichiometry and control of mass transfer.

In this context, the term 'hydrogen' includes any isotope or mixture thereof, in particular the naturally occurring isotopes $^1$H (protium), $^2$H (deuterium) and $^3$H (tritium). It is intended that the term 'hydrogenation' includes chemical reaction of a substance with molecular hydrogen wherein hydrogen is present as any isotope or mixture thereof.

The hydrogenation process according to the invention may be used to prepare isotopically-labeled compounds. Isotopically labeled compounds have structures wherein one or more atoms are replaced by an atom having a selected atomic mass or mass number. Examples of isotopes of hydrogen that can be incorporated into compounds using the hydrogenation process of the invention include $^2$H and $^3$H. Such isotopically labelled compounds are useful, for example, in metabolic and reaction kinetic studies imaging techniques. Furthermore, substitution with heavier isotopes, particularly deuterium (i.e., $^2$H or D) may afford certain therapeutic advantages resulting from greater metabolic stability, for example increased in vivo half-life or reduced dosage requirements or an improvement in therapeutic index. The concentration of such a heavier isotope, specifically deuterium, may be defined by the isotopic enrichment factor. The term "isotopic enrichment factor" as used herein means the ratio between the isotopic abundance and the natural abundance of a specified isotope.

It is intended that the term 'hydrogenation' includes chemical reaction of a compound or element with molecular hydrogen wherein hydrogen is added to a molecule without bond cleavage (e.g. reduction of an unsaturated bond) or wherein a carbon-carbon or carbon-heteroatom single bond is cleaved (hydrogenolysis).

The present invention provides a continuous hydrogenation process comprising:
  i) providing a liquid composition;
  ii) providing hydrogen gas;
  iii) mixing the liquid composition with the hydrogen gas in a mixing vessel;
  iv) transferring the mixture of liquid composition and hydrogen to a packed bed hydrogenation reactor to effect hydrogenation;
  v) transferring the reacted liquid composition to a heat exchanger to effect cooling to a pre-determined temperature.

In this context, a continuous process is defined as a method in which new materials are added and products removed continuously at a rate that maintains the reaction volume at a specific level. In other words, continuous reactors are reactors that may be used to carry out steady state operations.

It is a significant advantage of the process of the continuous flow process of the present invention that, in contrast to batch processes, the hydrogenation products that are formed and any unreacted hydrogen gas are removed continuously in order that critical volumes of potentially explosive hydrogen or reaction intermediates do not accumulate in the process apparatus. Furthermore, the risks associated with the use of flammable solvents are minimised. In particular, air and/or oxygen which may otherwise be present in a batch process may be eliminated in a continuous process.

As discussed herein above, hydrogenation is an exothermic reaction. In the present invention, the hydrogenated liquid composition is transferred from the packed bed hydrogenation reactor to a heat exchanger for rapid cooling. Suitably, the packed bed hydrogenation reactor operates as an adiabatic reactor and hydrogenation approximates to an adiabatic process within the reactor.

In this context, an adiabatic process is one in which no heat is transferred between the system and its surroundings.

An adiabatic process provides a rigorous conceptual basis for the theory used to expound the first law of thermodynamics, and as such it is a key concept in thermodynamics. Some chemical and physical processes occur so rapidly that they may be conveniently described by the "adiabatic approximation", meaning that there is not enough time for the transfer of energy as heat to take place to or from the system and its surroundings.

A skilled person will appreciate that an adiabatic process is a theoretical concept which serves as an approximation.

In this context, adiabatic reactor is understood to be a reactor, which is not deliberately cooled or heated.

Suitably the adiabatic reactor is a reactor wherein there is substantially no loss or gain of heat to or from the surroundings of the reactor.

In one embodiment, the packed bed hydrogenation reactor is insulated to inhibit any loss of heat to the surroundings.

In an alternative embodiment, heat is applied to the packed bed hydrogenation reactor to compensate for any loss of heat from the reactor to the surroundings. Suitably, heat is applied to the packed bed hydrogenation reactor via thermal transfer from a fluid with a low heat transfer coefficient, in particular a gas, to compensate for any loss of heat from the reactor to the surroundings.

A skilled person will appreciate that once the process has been initiated and steady state conditions achieved, the continuous process of the invention may operate continuously for many months.

In one embodiment, heat may be applied to the packed bed reactor when the process is initiated until a pre-determined hydrogenation reaction temperature is achieved. Preheating the packed bed hydrogenation reactor has the advantage of reducing the length of time required for steady state conditions to be achieved once the process of the invention has been initiated.

It is an advantage of the process of the present invention that continuous hydrogenation in the packed bed hydrogenation reactor, which suitably approximates to an adiabatic process, followed by rapid cooling, provides sufficient thermal control to enable commercial manufacture of thermally sensitive chemical intermediates and products, for example for the pharmaceutical industry.

It is a further advantage of the process of the present invention that mixing the liquid composition and hydrogen gas prior to transfer to the hydrogenation reactors maintains control of stoichiometry.

The liquid composition and hydrogen gas are provided as separate fluid streams which each may exhibit variations in flow rate and even though these variations may be small they can consequently lead to variable stoichiometry which is significant to the hydrogenation reaction in terms of formation of by-products and/or degradation products. Mixing the liquid composition and hydrogen gas in a mixing vessel prior to transfer to the reactor, averages these variations to more effectively control stoichiometry.

Suitably, hydrogenation is carried out in the presence of a catalyst.

In one embodiment, the continuous hydrogenation process of the invention is an heterogeneous catalytic hydrogenation.

In this context, heterogeneous catalytic hydrogenation is a hydrogenation process wherein the catalyst acts in a different phase than the reactants. Most heterogeneous catalysts are solids that act on substrates in a liquid or gaseous reaction mixture. The total surface area of solid has an important effect on the reaction rate. The smaller the catalyst particle size, the larger the solid surface area for a given mass of catalyst particles. Furthermore, smaller catalyst particle size results in smaller bubbles of hydrogen gas passing thorough the catalyst bed which increases the gas-liquid surface area for a given volume of hydrogen gas and also has an important effect on the reaction rate.

Heterogeneous catalysts are typically "supported," which means that the catalyst is dispersed on a second material, a support substrate (hereinafter a 'support') that enhances the effectiveness or minimises their cost. Supports prevent or reduce agglomeration and sintering of the small catalyst particles, exposing more surface area, thus catalysts have a higher specific activity (per gram) on a support. Sometimes the support is merely a surface on which the catalyst is spread to increase the surface area. Alternatively, the support and the catalyst may interact, affecting the catalytic reaction.

Supports are suitably porous materials with a high surface area, in particular alumina, zeolites, diatomaceous earth, or various kinds of activated carbon. Specialised supports include silicon dioxide, titanium dioxide, calcium carbonate, barium sulphate and metal sponges and foams.

In an alternative embodiment, the continuous hydrogenation process of the invention is an homogeneous catalytic hydrogenation.

In this context, homogeneous catalytic hydrogenation is a hydrogenation process wherein the catalyst acts in the same phase as the reactants. Typically homogeneous catalysts are dissolved in a solvent with the substrates.

Solubility of hydrogen gas in the liquid composition may be increased by increasing temperature and/or pressure In one embodiment, step (iii) comprises mixing the liquid composition with the hydrogen gas in a mixing vessel comprising inert packing material.

In this context, "inert" means that the packing material neither reacts with the starting compound, a homogeneous catalyst or hydrogen gas, nor catalyses the hydrogenation.

The inert packing material promotes mixing of the liquid composition with the hydrogen gas to further improve control of stoichiometry. Packing material with small particle size results in small, well dispersed bubbles of hydrogen gas and hence uniformity within the mixture of liquid composition and hydrogen gas. Furthermore, small gas bubble size increases the gas/liquid surface area thereby accelerating gas mass transfer across the phase boundary.

A skilled person will appreciate that the particle-size distribution (PSD) of a powder, or granular material, or particles dispersed in a fluid, is a list of values or a mathematical function that defines the relative amount of particles present according to size.

Particle Size Distribution D50 is also known as the median diameter or the medium value of the particle size distribution, it is the value of the particle diameter at 50% in the cumulative distribution. For example, if D50=50 µm, then 50% of the particles in the sample are larger than 50 µm, and 50% are smaller than 50 µm.

D10 is the value of the particle diameter at 10% in the cumulative distribution. For example, if D10=35 µm, then 90% of the particles in the sample are larger than 35 µm, and 10% are smaller than 35 µm.

D90 is the value of the particle diameter at 90% in the cumulative distribution. For example, if D90=65 µm, then 10% of the particles in the sample are larger than 65 µm, and 90% are smaller than 65 µm.

A skilled person will appreciate that 80% of the particles have a particle diameter with a value equal to or between the D10 and D90 values.

The ratio of D90 value to the D10 value (D90/D10) is an indication of the uniformity of particle sizes.

Distribution width may also be defined by the span wherein:

$$\text{span}=(D90-D10)/D50$$

PSD is typically defined in the context of the method by which it is determined.

For the purposes of this invention, particle size is determined using laser diffraction methods in accordance with ISO 13320:2009 which provides guidance on instrument qualification and size distribution measurement of particles through the analysis of their light-scattering properties.

Laser diffraction methods depend upon analysis of the "halo" of diffracted light produced when a laser beam passes through a dispersion of particles in air or in a liquid. The angle of diffraction increases as particle size decreases, so that this method is particularly good for measuring sizes between 0.1 and 3,000 µm. Advances in sophisticated data processing and automation have allowed this to become the dominant method used in industrial PSD determination. This technique is relatively fast and can be performed on very small samples. A particular advantage is that the technique can generate a continuous measurement for analyzing process streams. Laser diffraction measures particle size distributions by measuring the angular variation in intensity of light scattered as a laser beam passes through a dispersed particulate sample. Large particles scatter light at small angles relative to the laser beam and small particles scatter light at large angles. The angular scattering intensity data is then analyzed to calculate the size of the particles responsible for creating the scattering pattern, using the Mie theory of light scattering. The particle size is reported as a volume equivalent sphere diameter.

In one embodiment, the volume mean particle diameter of the inert packing material within the mixing vessel is less than 5000 µm, in particular less than 1000 µm, in particular less than 500 µm, in particular less than 100 µm, in particular less than 75 µm, in particular less than 50 µm, more particularly less than 30 µm, more particularly less than 20 µm.

In this context, the volume mean particle diameter is synonymous with volume mean diameter, de Broukere mean and D[4,3].

In one embodiment, the D50 value of the inert packing material within the mixing vessel is less than 5000 µm, in particular less than 1000 µm, in particular less than 500 µm, in particular less than 100 µm, in particular less than 75 µm, in particular less than 50 µm, more particularly less than 30 µm, more particularly less than 20 µm.

In a further embodiment, the span of the inert packing material within the mixing vessel is less than 2, in particular less than 1.75, more particularly less than 1.5, more particularly less than 1.25, more particularly less than 1, more particularly less than 0.9, more particularly less than 0.8, more particularly less than 0.75.

Uniformity of particle size allows effective packing of the inert packing material.

In one embodiment, the particle size distribution of the inert packing material within the mixing vessel approximates to a unimodal distribution.

In a further embodiment, the particle size distribution approximates to a log-normal distribution.

In one embodiment, particles which are outliers to the particle size distribution have been removed.

In a further embodiment excess particles which are outliers as result of having a particle diameter which is smaller than the particle size distribution (hereinafter "fines") have been removed. In a yet further embodiment, the fines have been removed by sieving.

Fines may represent migratory material within the packed inert material which may result in instability and undesirably high back pressures within the mixing vessel.

In a further embodiment excess particles which are outliers as result of having a particle diameter which is larger than the particle size distribution (hereinafter "oversize") have been removed. In a yet further embodiment, the oversize have been removed by sieving.

In one embodiment, the particles are substantially spherical.

In one embodiment, the process further comprises the step of transferring the liquid composition to a heater to effect heating to a pre-determined mixing temperature following step (ii) prior to step (iii).

In another embodiment, step (iii) comprises heating and mixing the liquid composition with the hydrogen gas in the mixing vessel at a pre-determined mixing temperature.

In one embodiment, heat may be applied to the mixing vessel when the process is initiated until a pre-determined mixing temperature is achieved. Pre-heating the mixing vessel has the advantage of reducing the length of time required for steady state conditions to be achieved once the process of the invention has been initiated.

In a further embodiment, the process further comprises the step of transferring the liquid composition and the hydrogen gas to a heater to effect heating to a pre-determined mixing temperature following step (ii) prior to step (iii).

Optionally, the pre-determined mixing temperature is such that the liquid composition is heated such that it becomes a supercritical fluid.

In this context, a supercritical fluid is any substance at a temperature and pressure above its critical point, where distinct liquid and gas phases do not exist. An advantage of supercritical hydrogenation when compared to hydrogenation performed under non-supercritical conditions is that hydrogen, which poorly dissolves in non-supercritical organic solvents, is almost completely miscible with supercritical fluids, and hence, by making use of such fluids, an increased amount of hydrogen may be delivered to the reaction site.

In a further embodiment, the process further comprises transferring the mixture of liquid composition and hydrogen at a pre-determined mixing temperature following step (iii) to a pre-reactor heat exchanger to effect cooling to a pre-determined reaction temperature prior to transferring the mixture of liquid composition and hydrogen to a packed bed hydrogenation reactor to effect hydrogenation in step (iv).

Suitably, the temperature and pressure within the packed bed hydrogenation reactor to effect hydrogenation in step (iv) is such that the liquid composition remains in the liquid phase.

In yet a further embodiment, the mixture of liquid composition and hydrogen is transferred from the pre-reactor heat exchanger to a packed bed hydrogenation reactor via a pipe packed with inert material. As discussed hereinabove, the solubility of hydrogen gas in a liquid typically increases with temperature. Cooling the mixture of liquid composition and hydrogen in the pre-reactor heat exchanger may effect nucleation of bubbles of hydrogen gas. Inert packing material with small particle size results in small, well dispersed bubbles of hydrogen gas and hence maintains uniformity within the mixture of liquid composition and hydrogen gas and thus stoichiometry.

In one embodiment, the volume mean particle diameter of the inert packing material within the pipe is less than 5000 μm, in particular less than 1000 μm, in particular less than 500 μm, in particular less than 100 μm, in particular less than 75 μm, in particular less than 50 μm, more particularly less than 30 μm, more particularly less than 20 μm In one embodiment, the D50 value of the inert packing material within the pipe is less than 5000 μm, in particular less than 1000 μm, in particular less than 500 μm, in particular less than 100 μm, in particular less than 75 μm, in particular less than 50 μm, more particularly less than 30 μm, more particularly less than 20 μm.

In a further embodiment, the span of the inert packing material within the pipe is less than 2, in particular less than 1.75, more particularly less than 1.5, more particularly less than 1.25, more particularly less than 1, more particularly less than 0.9, more particularly less than 0.8, more particularly less than 0.75.

Uniformity of particle size allows effective packing of the inert material.

In one embodiment, the particle size distribution of the inert packing material within the pipe approximates to a unimodal distribution.

In a further embodiment, the particle size distribution approximates to a log-normal distribution.

In one embodiment, particles which are outliers to the particle size distribution have been removed.

In a further embodiment excess particles which are outliers as result of having a particle diameter which is smaller than the particle size distribution (hereinafter "fines") have been removed. In a yet further embodiment, the fines have been removed by sieving.

Fines may represent migratory material within the packed inert material which may result in instability and undesirably high back pressures within the pipe.

In a further embodiment excess particles which are outliers as result of having a particle diameter which is larger than the particle size distribution (hereinafter "oversize") have been removed. In a yet further embodiment, the oversize have been removed by sieving.

In one embodiment, the particles are substantially spherical.

In one embodiment, the liquid composition comprises a starting compound to be hydrogenated.

In a further embodiment the liquid composition comprises the starting compound dissolved in a solvent.

In another embodiment wherein the process of the invention is an homogeneous catalytic hydrogenation, the liquid composition comprises a starting compound and a homogeneous catalyst dissolved in a solvent.

Optionally, the liquid composition in step (i) does not comprise a starting compound to be hydrogenated. The liquid composition in step (I) may be a solvent. Wherein the process of the invention is a homogeneous catalytic hydrogenation, the liquid composition in step (I) may be a solvent optionally comprising a homogeneous catalyst. Wherein, the liquid composition in step (i) does not comprise a starting compound to be hydrogenated, the starting compound to be hydrogenated may be provided in a second liquid composition and added to the mixture of liquid composition and hydrogen following step (iii).

Thus, In an alternative embodiment, the process further comprises the steps of a) providing a second liquid composition comprising a starting compound to be hydrogenated and b) adding the second liquid composition to the mixture of liquid composition and hydrogen following step (iii) prior to step (iv).

In a further embodiment, the second liquid composition comprises the starting compound dissolved in a solvent.

In a further embodiment wherein the process of the invention is a homogeneous catalytic hydrogenation, the second liquid composition comprises the starting compound and a homogeneous catalyst dissolved in a solvent.

In one embodiment, the starting compound is an unsaturated organic compound.

Unsaturated organic compounds are carbon containing molecules that have one or more double or triple covalent bonds between adjacent carbon atoms In a further embodiment, the unsaturated organic compound is selected from alkenes, alkynes and aromatics.

In another embodiment, the starting compound is selected from aldehydes, imines, and nitriles.

In an alternative embodiment, the starting compound is a compound suitable for hydrogenolysis whereby a carbon-carbon or carbon-heteroatom single bond is cleaved by hydrogen. In particular the starting compound comprises a heteroatom selected from S, O, N and halogen.

A skilled person will appreciated that the choice of the starting material is not critical; on the contrary, it is another advantage of the process that it can be applied to very different substrates.

In one embodiment, the liquid composition containing the starting compound to be hydrogenated submitted to step (iv) suitably contains 1 to 99%, more suitably 2 to 50% by weight, more suitably 4 to 25 wt %, most suitably 7.5 to 10 wt % of compound, based on the total weight of the mixture of liquid composition and dissolved hydrogen submitted to step (iv).

In another embodiment, the liquid composition consists of a starting compound, i.e. a starting compound which is liquid in the absence of a solvent.

For hydrogenation reactions, it is suitable to use hydrogenation-stable aromatic or non-aromatic solvents. The solvent must be suitable for use in hydrogenation. Suitable solvents include, but are not limited to, toluene, methanol, ethanol, acetone, methyl ethyl ketone, benzene, ethyl acetate, cyclohexane, methyl cyclohexane, petroleum ether, pyridine and water.

Gaseous hydrogen is potentially an extremely dangerous material. The handling and storing of hydrogen gas typically requires the usage of specialist equipment and compliance with the requisite safety measures.

Optionally, hydrogen may be generated in situ to minimise such concerns, for example hydrogen may be obtained from water by means of electrolysis, for example using a solid oxide electrolysis cell (SOEC), polymer electrolyte membrane cell (PEM) or alkaline electrolysis cell (AEC).

In one embodiment, the hydrogen gas is provided by a hydrogen generator.

In a further embodiment, the hydrogen generator is an electrolytic cell. The quantity of the evolved hydrogen is controlled by the intensity of the electrolyzing direct current.

In one embodiment, the pressure of the generated hydrogen before its feeding into the mixing vessel is 1 to 1000 bar, in particular 100 to 1000 bar.

In another embodiment, the hydrogen gas is provided by a hydrogen storing cylinder equipped with a cylinder valve.

In one embodiment, the hydrogen gas is first compressed, before introduction into the mixing vessel.

In a further embodiment, the hydrogen gas is suitably compressed to the desired pressure range by the use of an appropriate compressor. In a further embodiment, the absolute pressure of the compressed hydrogen ranges between 1 and 1000 bar, in particular between 100 and 1000 bar.

In one embodiment, the hydrogen gas is compressed to a pressure greater than 100 bar.

The compressed hydrogen gas is added to the liquid composition in step (iii).

A packed bed reactor is a hollow tube, pipe, or other vessel that is filled with a packing material. The packing can be randomly filled with small objects like Raschig rings or else it can be a specifically designed structured packing. Packed beds may also contain catalyst particles and/or adsorbents such as a zeolite, granular activated carbon, etc.

In one embodiment, wherein the process of the invention is heterogeneous catalytic hydrogenation, the packing material comprises a catalyst.

The total surface area of a solid catalyst has an important effect on the reaction rate. The smaller the catalyst particle size, the larger the surface area for a given mass of catalyst particles. Furthermore, smaller catalyst particle size results in smaller bubbles of hydrogen gas passing thorough the catalyst bed which increases the gas-liquid surface area for a given volume of hydrogen gas and also has an important effect on the reaction rate.

In the case of heterogeneous catalytic hydrogenation, the control of mass transfer of hydrogen is rate determining.

Traditional TBRs employ a significant excess of hydrogen gas and large catalyst pellets. Mass transfer of hydrogen predominantly occurs on the surfaces of the catalyst pellets. The hydrogen gas which does penetrate into the catalyst structure is rapidly consumed by reaction and is replenished at a lesser rate than on the surface of the catalyst. Consequently, there exists two distinct environments within the catalyst bed; a low hydrogen concentration within the catalyst structure and a high concentration on the catalyst surface. Furthermore, the reaction time observed by a divisible part of the reaction mass will be highly dependent upon the particular route through the bed. Reaction solution remains within a large particle for considerably longer than if it merely passes over a particle; many different paths can be taken through a packed bed comprising coarse packing which may lead to wide reaction time distributions. This variability in reaction conditions results in insufficient reaction control for manufacture of sensitive and complex chemical intermediates and products required, for example, in the pharmaceutical industry.

It as advantage of the process of the invention that smaller particle size catalysts result in higher surface area to volume ratios for both the catalyst and the bubbles of hydrogen gas passing through the catalyst bed, which significantly increases control of mass transfer of hydrogen.

A further advantage of a packed bed reactor comprising smaller size particles is the prevention of aerosol formation.

In one embodiment, the volume mean particle diameter of the catalyst particles is less than 100 µm, in particular less than 75 µm, in particular less than 50 µm, more particularly less than 30 µm, more particularly less than 20 µm.

In one embodiment, the D50 value of the catalyst particles is less than 100 µm, in particular less than 75 µm, in particular less than 50 µm, more particularly less than 30 µm, more particularly less than 20 µm.

In a further embodiment, the span of the catalyst particles is less than 2, in particular less than 1.75, more particularly less than 1.5, more particularly less than 1.25, more particularly less than 1, more particularly less than 0.9, more particularly less than 0.8, more particularly less than 0.75.

Uniformity of particle size allows effective packing of the catalyst bed.

In one embodiment, the particle size distribution of the catalyst particles approximates to a unimodal distribution.

In a further embodiment, the particle size distribution approximates to a log-normal distribution.

In one embodiment, particles which are outliers to the particle size distribution have been removed.

In a further embodiment excess particles which are outliers as result of having a particle diameter which is smaller than the particle size distribution (hereinafter "fines") have been removed. In a yet further embodiment, the fines have been removed by sieving.

Fines may represent migratory material within the packed bed which may result in bed instability and undesirably high back pressures within the reactor.

In a further embodiment excess particles which are outliers as result of having a particle diameter which is larger than the particle size distribution (hereinafter "oversize") have been removed. In a yet further embodiment, the oversize have been removed by sieving.

In one embodiment, the catalyst particles are substantially spherical.

In another embodiment, the catalyst is supported.

In the context of the particle size of a supported catalyst, a catalyst particle is defined herein as a particle comprising the catalyst support material and the catalyst.

A skilled person will appreciate that the catalyst support material is important to heterogeneous catalytic hydrogenation. As discussed above, the catalyst may be dispersed on a suitable support to make the catalytic nanoparticles stable and obtain optimal performance and decrease the amount of costly metal being utilised, which accordingly decrease the total catalyst expenses. Furthermore, with porous characteristics, support materials can provide a high dispersion of nanoparticle catalyst and simplify electron transfer, both of which contribute to improved catalytic activity.

Mass transfer limitations play an important role on the rate of reaction; the rate of conversion and product formation, including in the catalytic systems. In a homogeneous catalytic reaction in which all substances (reactant(s), product(s), and catalyst) are in the same phase, the effect of mass transfer between phases is mostly negligible. In a heterogeneous catalytic reaction, the catalyst is in a different phase from the reactant(s). Typically the catalyst is in the solid phase whilst the reacting species are in the liquid or gaseous phase. Consequently, the reaction rate is principally dependent upon the mass transfer or diffusion between these phases.

Whilst not bound by theory, a reaction catalysed by solid catalysts occurs when the reactant molecules come in contact with the active sites, which are usually located inside the catalyst pores. The catalytic reaction is taken place after the reactant molecules diffuse through the fluid layer surrounding the catalyst particles (external diffusion or film diffusion), then through the pore within the particle (internal diffusion). The internal diffusion of the molecules competes with the reaction; at the same time, the external mass transfer is dependent on the fluid film thickness and the activity on the outer layer. Hence, the diffusion of molecules is not only hindered by the other molecules, but also by physical hindrances. A catalytic reaction may be described in seven steps, i.e. (1) diffusion of the reactants from the bulk phase (boundary layer) to the external surface of the catalyst particle (film diffusion or interphase diffusion), (2) diffusion of the reactant from the pore mouth through the catalyst pores to the immediate vicinity of the internal catalytic surface; the site where the chemical transformation occurs, (pore diffusion or intraparticle diffusion), (3) adsorption of reactants on the inner catalytic surface, (4) reaction at specific active sites on the catalyst surface, (5) desorption of the products from the inner surface, (6) diffusion of the products from the interior of the catalyst particle to the pore mouth at the external surface, and (7) diffusion of the products from the external catalyst surface to the bulk fluid (interphase diffusion).

The morphology and pore size of the selected support material may therefore play an important role in the heterogeneous catalyst's stability and performance.

Furthermore, the physical structure of the catalyst support typically contributes significantly to the mechanical properties of the packed bed, for example friability A skilled person will appreciate that supported catalysts may be prepared using methods known in the art. Two methods which are typically used to prepare supported catalysts are the impregnation method and the co-precipitation method. In the impregnation method, a suspension of the solid support is treated with a solution of a precatalyst, and the resulting material is then activated under conditions that will convert the precatalyst (for example a metal salt) to a more active state, for example the metal itself. Alternatively, supported catalysts can be prepared from homogeneous solution by co-precipitation. For example, an acidic solution of aluminium salts and precatalyst are treated with base to precipitate the mixed hydroxide, which is subsequently calcined.

Supports are typically thermally very stable and withstand processes required to activate precatalysts. For example, precatalysts may be activated by exposure to a stream of hydrogen at high temperatures.

In a further embodiment, the support material is alumina, silica, titania, a zeolite, diatomaceous earth, or a metal sponge or foam.

In a yet further embodiment, the support material is alumina.

Suitably the catalyst is a metal, including but not limited to: a platinum group metal, in particular platinum, palladium, rhodium, or ruthenium; a non-platinum group metal, in particular nickel (such as Raney nickel and Urushibara nickel), iron, or cobalt; or a mixture thereof.

Suitably the catalyst is an alumina supported platinum group metal, in particular alumina supported platinum or alumina supported palladium. In a further embodiment, the volume mean particle diameter of the catalyst particles is less than 100 µm, in particular less than 50 µm, more particularly less than 30 µm, more particularly less than 20 µm, more particularly less than 10 µm.

In an alternative embodiment, wherein the process of the invention is homogeneous catalytic hydrogenation, the packing material is inert.

In this context, "inert" means that the packing material neither reacts with the starting compound, the homogeneous catalyst or hydrogen gas, nor catalyses the hydrogenation.

Packing material with smaller particle size results in smaller bubbles of hydrogen gas passing thorough the packed bed which increases the gas-liquid surface area for a given volume of hydrogen gas, enhances mass transfer of hydrogen and therefore has an important effect on the reaction rate.

In one embodiment, the volume mean particle diameter of the inert packing material within the reactor is less than 100 μm, in particular less than 75 μm, in particular less than 50 μm, more particularly less than 30 μm, more particularly less than 20 μm.

In one embodiment, the D50 value of the inert packing material within the reactor is less than 100 μm, in particular less than 75 μm, in particular less than 50 μm, more particularly less than 30 μm, more particularly less than 20 μm.

In a further embodiment, the span of the inert packing material within the reactor is less than 2, in particular less than 1.75, more particularly less than 1.5, more particularly less than 1.25, more particularly less than 1, more particularly less than 0.9, more particularly less than 0.8, more particularly less than 0.75.

Uniformity of particle size allows effective packing of the bed.

In one embodiment, the particle size distribution of the inert packing material within the reactor approximates to a unimodal distribution.

In a further embodiment, the particle size distribution approximates to a log-normal distribution.

In one embodiment, particles which are outliers to the particle size distribution have been removed.

In a further embodiment excess particles which are outliers as result of having a particle diameter which is smaller than the particle size distribution (hereinafter "fines") have been removed. In a yet further embodiment, the fines have been removed by sieving.

Fines may represent migratory material within the packed bed which may result in bed instability and undesirably high back pressures within the reactor.

In a further embodiment excess particles which are outliers as result of having a particle diameter which is larger than the particle size distribution (hereinafter "oversize") have been removed. In a yet further embodiment, the oversize have been removed by sieving.

In one embodiment, the particles are substantially spherical.

Suitably, the homogeneous catalyst is rhodium-based Wilkinson's catalyst, iridium-based Crabtree's catalyst, a Noyori catalyst (ruthenium-BINAP based or a 'second generation' catalyst comprising a ruthenium metal centre, a chiral diphosphine and a chiral diamine ligand)

It is an advantage of the present process that continuous hydrogenation can be carried out without the use of microreactor technology. Microreactors are expensive and there are significant technical hurdles to be overcome in scaling up to manufacturing scale, as described hereinabove in the context of the apparatus disclosed in WO 2005/107936.

A microreactor is generally defined as a miniaturised reactor (mini- or microreactor) with characteristic dimensions (channel or plate width) in micrometers to millimetres (preferably from 0.01 mm to 10.0 mm). The characteristic feature of a microreactor is typically that at least one of the three spatial dimensions of the reaction space is in the range from 1 to 2000 μm. Microreactors are distinguished from other reactors by a high transfer specific inner surface, short residence times of the reactants and high specific heat and mass transfer levels. The microreactor is typically a continuous microreactor, i.e. a microreactor suitable for use in a continuous process. The micro reactor typically comprises a device allowing the reactants (gaseous or liquid) to enter and continuously flow through. The reactants are contacted with each other in the device, allowing a chemical reaction to take place in a narrow confined space like a channel or between two plates. One (in the case of plates) or two (in case of channels or grooves) dimensions of the micro reactor are chosen in such a way that the characteristic times for heat transfer and/or mass transfer are very low. Herewith high rates of reaction and heat transfer can be handled in a controlled fashion. The heat is transferred to or from a heat transfer fluid that does not come into contact with the reactants or the products. The walls of the micro reactor may contain catalytic activity. A (bio)catalyst may be deposited, immobilized or coated on the wall. A number of microreactors may be combined in parallel to form a "structured reactor", thus a mere arrangement of microreactors. Entering reactants are distributed over manifold systems or other distribution systems to the individual microreactors. Each microreactor may include mixing zones to mix the entering reactants and/or the reaction medium. Each microreactor may contain residence zones to allow the reaction medium to obtain sufficient conversion. The micro-reactor may be constructed of, or may contain, a number of parallel sub-units (mixing zones with residence zones) in a numbering-up concept to obtain sufficient production capacity. Thus, the volume, available for reaction depends on the diameter and length of the microreactor, or in case a microreactor is used on the dimension of the parallel channels and the number of parallel channels. The volume of micro-reactors or microreactors typically lies in the range of 1 ml to 1 m$^3$, preferably from 10 ml to 50 l. Typically, a microreactor is defined as a reactor having a channel with a hydraulic diameter of 20 mm or less. A detailed account on microreactors and their arrangement in structured reactors is presented, for example, by Jahnisch et al. in Angewandte Chemie, Vol. 116, 410-451 (2004), herein incorporated by reference.

Hydrogenation is suitably performed at a temperature of typically between 20° C. and 250° C.

Hydrogen can be introduced to the reaction mixture in step (iv) in a molar range of 0.9 to 10 molar equivalents, suitably in the range of 0.9 to 6 molar equivalents, calculated on the molar amount of starting compound to be hydrogenated. Suitably, hydrogen can be introduced to the reaction mixture in step (iv) in a molar range of 0.9 to 5 stoichiometric molar equivalents, suitably in the range of 0.9 to 3 stoichiometric molar equivalents, in particular 0.9 to 2 stoichiometric molar equivalents calculated on the molar amount of hydrogen required as determined by the stoichiometry of the hydrogenation reaction and the molar amount of starting compound to be hydrogenated.

Hydrogenation is preferably performed at a pressure in the aforementioned range.

The reaction of hydrogen with the starting compound to the hydrogenated suitably takes place at a flow rate of 0.1-10000 g/minute, in particular, flow rates of 1-1000 g/minute and more particularly at flow rates of 10-1000 g/minute.

In one embodiment, the delivery of hydrogen gas is controlled to achieve a pre-determined increase in temperature of the liquid composition as a result of hydrogenation in the packed bed reactor in step (iv). It is an advantage of such conditions that the temperature of the liquid composition is maintained within a pre-determined range.

In one embodiment, wherein the reacted liquid composition is partially hydrogenated, the process of the invention further comprises after step (v) (i.e., transferring the partially hydrogenated liquid composition to a heat exchanger to effect cooling to a pre-determined temperature), the steps of
 a) transferring the partially hydrogenated liquid composition to a second packed bed hydrogenation reactor to effect further hydrogenation;
 b) transferring the hydrogenated liquid composition to a second heat exchanger to effect cooling to a second pre-determined temperature.

In one embodiment, the delivery of hydrogen gas is controlled to achieve a pre-determined increase in temperature of the liquid composition as a result of hydrogenation in the second packed bed reactor. It is an advantage of such conditions that the temperature of the liquid composition is maintained within a pre-determined range.

The continuous hydrogenation process of the present invention may therefore use a number of discrete hydrogenation steps to control precisely the temperature of the reaction. A skilled person will appreciate that steps a) and b) may be repeated as iterative steps, i.e.
 a) transferring the partially hydrogenated liquid composition to a $n^{th}$ packed bed hydrogenation reactor to effect further hydrogenation;
 b) transferring the hydrogenated liquid composition to a $n^{th}$ heat exchanger to effect cooling to a $n^{th}$ pre-determined temperature.

In one embodiment, the delivery of hydrogen gas is controlled to achieve a pre-determined increase in temperature of the liquid composition as a result of hydrogenation in the $n^{th}$ packed bed reactor. It is an advantage of such conditions that the temperature of the liquid composition is maintained within a pre-determined range.

In another aspect, the present invention provides a flow-type hydrogenation apparatus for performing hydrogenation, comprising a heat exchanger, a mixing vessel, one or more hydrogenation reactors, a back pressure regulator, a hydrogen source, and a mass flow controller;
the mixing vessel having one or more inlet ports, wherein the or each inlet port is configured to receive therethrough a liquid and/or hydrogen from the hydrogen source, and an outlet port in fluid communication with the one or more hydrogenation reactors;
the mass flow controller being located downstream of the hydrogen source and upstream of the mixing vessel;
the or each hydrogenation reactor having an inlet port in fluid communication with the mixing vessel and an outlet port;
the or each hydrogenation reactor being a packed bed reactor;
wherein the heat exchanger is located downstream of the one or more hydrogenation reactors and upstream of the back pressure regulator.

Suitably, the apparatus of the present invention is a flow-type hydrogenation apparatus for performing liquid phase hydrogenation.

In this context 'liquid phase hydrogenation' means that a starting compound to be hydrogenated is comprised in a liquid composition which remains in the liquid phase during hydrogenation in the one or more hydrogenation reactors. A skilled person will appreciate that mixture of the liquid composition and hydrogen gas is present in the one or more hydrogenation reactors.

In this context, a "back pressure regulator" is a device which limits and precisely controls the upstream pressure of a gas or liquid.

In this context, a "mass flow controller" is a device which measures and control the flow of liquids and gases, suitably hydrogen. A mass flow controller is designed and calibrated to control a specific type of liquid or gas at a particular range of flow rates.

It is an advantage of this arrangement that it provides a constant flow of hydrogen gas thereby providing hydrogen gas at stable and useful hydrogen concentrations.

A skilled person will appreciate that control of hydrogen stoichiometry is important to prevent partial hydrogenation and/or formation of undesirable by-products In one embodiment, the apparatus further comprises a liquid reservoir in fluid communication with the mixing vessel inlet port configured to receive a liquid.

A skilled person will appreciate that a pressure differential is required within the system to effect fluid flow. In one embodiment, the apparatus further comprises a pump upstream of the mixing vessel to pump a liquid into the mixing vessel via the inlet port configured to receive the liquid. In an alternative embodiment, the apparatus further comprises a liquid reservoir and a hydraulic pressure is applied to a liquid in the reservoir. In a further alternative embodiment, the pressure within the system may be provided by a gravitational force acting on the fluid.

A skilled person will appreciate that in one embodiment the mixing vessel includes a single inlet port configured to receive a liquid and hydrogen from the hydrogen source. In an alternative embodiment, the mixing vessel includes a first inlet port configured to receive a liquid and a second inlet port in fluid communication with the hydrogen source.

In one embodiment, the mixing vessel comprises inert packing material.

The inert packing material promotes mixing of the liquid composition with the hydrogen gas to further improve control of stoichiometry. Packing material with small particle size results in small, well dispersed bubbles of hydrogen gas and hence uniformity within the mixture of liquid composition and hydrogen gas.

In one embodiment, the volume mean particle diameter of the inert packing material within the mixing vessel is less 5000 µm, in particular less than 1000 µm, in particular less than 500 µm, in particular less than 100 µm, in particular less than 75 µm, in particular less than 50 µm, more particularly less than 30 µm, more particularly less than 20 µm.

In one embodiment, the D50 value of the inert packing material within the mixing vessel is less than 5000 µm, in particular less than 1000 µm, in particular less than 500 µm, in particular less than 100 µm, in particular less than 75 µm, in particular less than 50 µm, more particularly less than 30 µm, more particularly less than 20 µm.

In a further embodiment, the span of the inert packing material within the mixing vessel is less than 2, in particular less than 1.75, more particularly less than 1.5, more particularly less than 1.25, more particularly less than 1, more particularly less than 0.9, more particularly less than 0.8, more particularly less than 0.75.

Uniformity of particle size allows effective packing of the inert packing material.

In one embodiment, the particle size distribution of the inert packing material within the mixing vessel approximates to a unimodal distribution.

In a further embodiment, the particle size distribution approximates to a log-normal distribution.

In one embodiment, particles which are outliers to the particle size distribution have been removed.

In a further embodiment excess particles which are outliers as result of having a particle diameter which is smaller than the particle size distribution (hereinafter "fines") have been removed. In a yet further embodiment, the fines have been removed by sieving.

In a further embodiment excess particles which are outliers as result of having a particle diameter which is larger than the particle size distribution (hereinafter "oversize") have been removed. In a yet further embodiment, the oversize have been removed by sieving.

In one embodiment, the particles are substantially spherical.

Suitably, the apparatus comprises a heater to heat the liquid. Optionally the heater heats the liquid and the hydrogen gas.

In one embodiment, the mixing vessel comprises a heater to effect heating in addition to mixing.

In one embodiment, the mixing vessel comprises a heater in order that heat may be applied to the mixing vessel when the hydrogenation process is initiated until a pre-determined mixing temperature is achieved. Pre-heating the mixing vessel has the advantage of reducing the length of time required for steady state conditions to be achieved once the process has been initiated.

In another embodiment, the apparatus comprises a heater being located upstream of the mixing vessel.

In one embodiment, the apparatus further comprises a junction, having two inlet ports and an outlet port, located downstream of the mixing vessel and upstream of the one or more hydrogenation reactors; one inlet port is in fluid communication with the mixing vessel outlet port and the second inlet port is configured to receive a second liquid; the outlet port is in fluid communication with the or each hydrogenation reactor.

In a further embodiment, the apparatus comprises a pump located upstream of the junction to pump the second liquid into the junction via the inlet port configured to receive a second liquid.

Suitably, the apparatus further comprises a liquid reservoir in fluid communication with the inlet port configured to receive a second liquid.

Suitably in use, a mixture of liquid composition and dissolved hydrogen at a pre-determined mixing temperature is cooled to a pre-determined reaction temperature after mixing and prior to transferring the mixture of liquid composition and dissolved hydrogen to a packed bed hydrogenation reactor to effect hydrogenation. Accordingly, in one embodiment the apparatus further comprises a pre-reactor heat exchanger being located between, and in fluid communication with the outlet port of the mixing vessel and the one or more hydrogenation reactors.

Suitably the pre-reactor heat exchanger is connected to the one or more hydrogenation reactors via one or more pipes packed with inert material. As discussed hereinabove, the solubility of hydrogen gas in a liquid typically increases with temperature. Cooling the mixture of liquid composition and hydrogen in the pre-reactor heat exchanger may effect nucleation of bubbles of hydrogen gas. Inert packing material with small particle size results in small, well dispersed bubbles of hydrogen gas and hence maintains uniformity within the mixture of liquid composition and hydrogen gas and thus stoichiometry.

In one embodiment, the volume mean particle diameter of the inert packing material within the pipe is less than 5000 µm, in particular less than 1000 µm, in particular less than 500 µm, in particular less than 100 µm, in particular less than 75 µm, in particular less than 50 µm, more particularly less than 30 µm, more particularly less than 20 µm.

In one embodiment, the D50 value of the inert packing material within the pipe is less than 5000 µm, in particular less than 1000 µm, in particular less than 500 µm, in particular less than 100 µm, in particular less than 75 µm, in particular less than 50 µm, more particularly less than 30 µm, more particularly less than 20 µm.

In a further embodiment, the span of the inert packing material within the pipe is less than 2, in particular less than 1.75, more particularly less than 1.5, more particularly less than 1.25, more particularly less than 1, more particularly less than 0.9, more particularly less than 0.8, more particularly less than 0.75.

Uniformity of particle size allows effective packing of the inert material.

In one embodiment, the particle size distribution of the inert packing material within the pipe approximates to a unimodal distribution.

In a further embodiment, the particle size distribution approximates to a log-normal distribution.

In one embodiment, particles which are outliers to the particle size distribution have been removed.

In a further embodiment excess particles which are outliers as result of having a particle diameter which is smaller than the particle size distribution (hereinafter "fines") have been removed. In a yet further embodiment, the fines have been removed by sieving.

In a further embodiment excess particles which are outliers as result of having a particle diameter which is larger than the particle size distribution (hereinafter "oversize") have been removed. In a yet further embodiment, the oversize have been removed by sieving.

In one embodiment, the particles are substantially spherical.

In one embodiment, the or each packed bed hydrogenation reactor is an adiabatic reactor.

In one embodiment, the or each hydrogenation reactor is liquid-phase hydrogenation reactor.

In this context 'liquid-phase hydrogenation reactor' means an hydrogenation reactor in which a starting compound to be hydrogenated is comprised in a liquid composition which remains in the liquid phase during hydrogenation. A skilled person will appreciate that mixture of the liquid composition and hydrogen gas is present in the hydrogenation reactor.

In one embodiment, the or each packed bed hydrogenation reactor is insulated to inhibit any loss of heat to the surroundings.

In one embodiment, heat is applied to the or each packed bed hydrogenation reactor to compensate for any loss of heat from the reactor to the surroundings. In a further embodiment, heat is applied to the packed bed hydrogenation reactor via thermal transfer from a fluid with a low heat transfer coefficient, in particular a gas, to compensate for any loss of heat from the reactor to the surroundings.

In one embodiment, the or each packed bed hydrogenation reactor comprises a heater.

In a further embodiment, the or each hydrogenation reactor comprises a heater in order that heat may be applied to the one or more packed bed reactors when the process is initiated until a pre-determined hydrogenation reaction temperature is achieved in each reactor. Pre-heating the one or more packed bed hydrogenation reactors has the advantage of reducing the length of time required for steady state conditions to be achieved once the process of the invention has been initiated.

In one embodiment, wherein the apparatus is suitable for heterogeneous catalytic hydrogenation, the packed bed hydrogenation reactor comprises a packed bed of catalyst particles.

In one embodiment, the volume mean particle diameter of the catalyst particles is less than 100 μm, in particular less than 75 μm, in particular less than 50 μm, more particularly less than 30 μm, more particularly less than 20 μm.

In one embodiment, the D50 value of the catalyst particles is less than 100 μm, in particular less than 75 μm, in particular less than 50 μm, more particularly less than 30 μm, more particularly less than 20 μm.

In a further embodiment, the span of the catalyst particles is less than 2, in particular less than 1.75, more particularly less than 1.5, more particularly less than 1.25, more particularly less than 1, more particularly less than 0.9, more particularly less than 0.8, more particularly less than 0.75.

Uniformity of particle size allows effective packing of the catalyst bed.

In one embodiment, the particle size distribution of the catalyst particles approximates to a unimodal distribution.

In a further embodiment, the particle size distribution approximates to a log-normal distribution.

In one embodiment, particles which are outliers to the particle size distribution have been removed.

In a further embodiment excess particles which are outliers as result of having a particle diameter which is smaller than the particle size distribution (hereinafter "fines") have been removed. In a yet further embodiment, the fines have been removed by sieving.

In a further embodiment excess particles which are outliers as result of having a particle diameter which is larger than the particle size distribution (hereinafter "oversize") have been removed. In a yet further embodiment, the oversize have been removed by sieving.

In one embodiment, the catalyst particles are substantially spherical.

In another embodiment, the catalyst is supported.

In a further embodiment, the support material is alumina, silica, titania, a zeolite, diatomaceous earth, or a metal sponge or foam.

In a yet further embodiment, the support material is alumina.

Suitably the catalyst is a metal, including but not limited to: a platinum group metal, in particular platinum, palladium, rhodium, or ruthenium; a non-platinum group metal, in particular nickel (such as Raney nickel and Urushibara nickel), iron, or cobalt; or a mixture thereof.

Suitably the catalyst is an alumina supported platinum group metal, in particular alumina supported platinum or alumina supported palladium. In a further embodiment, the volume mean particle diameter of the alumina supported platinum group metal catalyst particle is less than 100 μm, in particular less than 50 μm, more particularly less than 30 μm, more particularly less than 20 μm, more particularly less than 10 μm.

In an alternative embodiment, wherein the apparatus is suitable for homogeneous catalytic hydrogenation, the packed bed hydrogenation reactor comprises a packed bed of inert particles. In a further embodiment, the apparatus further comprises a homogenous catalyst.

In one embodiment, the volume mean particle diameter of the inert packing material within the reactor is less than 100 μm, in particular less than 75 μm, in particular less than 50 μm, more particularly less than 30 μm, more particularly less than 20 μm.

In one embodiment, the D50 value of the inert packing material within the reactor is less than 100 μm, in particular less than 75 μm, in particular less than 50 μm, more particularly less than 30 μm, more particularly less than 20 μm.

In a further embodiment, the span of the inert packing material within the reactor is less than 2, in particular less than 1.75, more particularly less than 1.5, more particularly less than 1.25, more particularly less than 1, more particularly less than 0.9, more particularly less than 0.8, more particularly less than 0.75.

Uniformity of particle size allows effective packing of the bed.

In one embodiment, the particle size distribution of the inert packing material within the reactor approximates to a unimodal distribution.

In a further embodiment, the particle size distribution approximates to a log-normal distribution.

In one embodiment, particles which are outliers to the particle size distribution have been removed.

In a further embodiment excess particles which are outliers as result of having a particle diameter which is smaller than the particle size distribution (hereinafter "fines") have been removed. In a yet further embodiment, the fines have been removed by sieving.

In a further embodiment excess particles which are outliers as result of having a particle diameter which is larger than the particle size distribution (hereinafter "oversize") have been removed. In a yet further embodiment, the oversize have been removed by sieving.

In one embodiment, the particles are substantially spherical.

A skilled person will appreciate that a packed bed system comprising particles wherein the volume mean particle diameter is less than 100 μm may exhibit particle movement with repeated use such that imperfections, such as cracks, in the bed may develop, which are detrimental to the performance of the hydrogenation reactor.

Suitably, the apparatus of the invention may further comprise a gas reservoir in fluid communication with the or each hydrogenation reactor via a valve. It is an advantage of this arrangement that it is possible to redistribute the particles using a controlled pressure differential to repair cracks in the bed. In this embodiment, the hydrogenation reactor is purged with a mixture of liquid solvent and dissolved hydrogen gas at elevated pressure. The gas reservoir contains an inert gas, such as nitrogen or argon, at standard temperature and pressure. Opening the valve to the gas reservoir results in an immediate, yet controlled, drop in pressure within the hydrogenation reactor and sudden release of hydrogen gas and liquid from the bed. This decompression event creates forces within the bed, resulting in redistribution of the particles.

In one embodiment, the apparatus of the invention comprises two or more hydrogenation reactors, each hydrogenation reactor being located between, and in fluid communication with, the outlet port of the mixing vessel and the heat exchanger.

In a further embodiment of the apparatus of the invention, the two or more hydrogenation reactors comprise a first hydrogenation reactor and a second hydrogenation reactor and the apparatus comprises a further heat exchanger located between, and in fluid communication with, the first and second hydrogenation reactors.

A skilled person will appreciate that hydrogen gas may suitably be generated in situ. Accordingly, the hydrogen source may comprise a hydrogen generator.

Suitably, the hydrogen gas is at an elevated pressure. Accordingly, the apparatus may further comprise a hydrogen compressor.

In one embodiment, the apparatus further comprises a hydrogen reservoir.

In one embodiment, the hydrogen compressor is an electrochemical hydrogen compressor. An electrochemical hydrogen compressor is a hydrogen compressor wherein hydrogen is supplied to the anode, and compressed hydrogen is collected at the cathode. A multi-stage electrochemical hydrogen compressor incorporates membrane-electrode-assemblies (MEAs) separated by proton exchange membranes (PEMs) in series to reach higher pressures. When a current is passed through the MEA, protons and electrons are generated at the anode. The protons are electrochemically driven across the membrane to the cathode, after which they re-combine at the cathode to producing hydrogen at elevated pressure.

An advantage of an electrochemical hydrogen compressor is that a constant, stable flow of high pressure hydrogen gas may be generated on demand without the need for a high pressure hydrogen reservoir. A skilled person will appreciate that storage of high pressure hydrogen poses significant technical and safety issues.

Suitably, the apparatus comprises a one-way valve located downstream of the hydrogen source and upstream of the mixing vessel.

In a further embodiment, the apparatus comprises a hydrogen delivery pressure regulator and a one-way valve, wherein the one-way valve allows hydrogen to flow when the pressure upstream of the valve is greater than the pressure downstream, and wherein the hydrogen delivery pressure regulator comprises a three way valve and an exhaust such that (i) when the three way valve is in a 'closed' position, excess hydrogen is vented through the exhaust and (ii) when the three way valve is an 'open' position the pressure of the hydrogen upstream of the one-way valve increases to force the one-way valve to open and permit flow of hydrogen into the mixing vessel.

The hydrogen delivery pressure regulator is vented to prevent upstream pressure build up such that when the three way valve is turned to the open position to permit flow of hydrogen through the one-way valve into the mixing vessel, a sudden pulse of hydrogen is not introduced into the mixing vessel. As described above, it is highly desirable that hydrogen addition is well controlled in order to control the high exothermic hydrogenation reaction.

In one embodiment, the apparatus further comprises temperature sensors located at the inlet port and outlet port of the or each hydrogenation reactor to measure the temperature of the liquid composition in use.

Suitably, the apparatus further comprises a controller in communication with the temperature sensors.

Suitably, the controller is in communication with the mass flow controller.

Suitably, wherein the apparatus further comprises a one-way valve, and a hydrogen pressure regulator, the one-way valve, and the hydrogen pressure regulator are in communication with the controller.

In a further embodiment, wherein the apparatus further comprises a pump, the pump is in communication with the controller.

Suitably, the controller is in communication with the temperature sensors and the mass flow controller such that delivery of hydrogen gas is controlled to achieve a predetermined increase in temperature of the liquid composition as a result of hydrogenation in each reactor in use.

It should be appreciated that the terms "embodiment" and "an embodiment of the invention" should be understood to refer to any embodiment or aspect of the invention as defined or described herein. Therefore, it should be understood that the features of specific embodiments can be combined with one or more other specific features described herein or be combined with any aspect or embodiment of the invention described herein. All such combinations of features are considered to be within the scope of the invention defined in the claims.

An embodiment of the invention will now be described, by way of example only, with reference to the accompanying drawings in which:

FIG. 1 is a schematic diagram of a flow-type hydrogenation apparatus for performing hydrogenation according to the invention.

For the avoidance of doubt, the skilled person will appreciate that in this specification, the terms "upstream", and "downstream" refer to the position of the components as found in the apparatus in normal use defined in relation to the process flow.

A flow-type hydrogenation apparatus 1 according to the invention is shown in FIG. 1.

The flow-type hydrogenation apparatus 1 comprises a hydrogen source 20, a hydrogen compression module 30, a hydrogen delivery system 40, a liquid delivery module 50, a mixing module 60, a hydrogenation module 70 and a back pressure regulator 80. The hydrogen source 20 is in fluid communication with the hydrogen compression module 30; the hydrogen compression module 30 is in fluid communication with the hydrogen delivery module 40; the hydrogen delivery module 40 and the liquid delivery module 50 are both in fluid communication with the mixing module 60; and the mixing module 60 is in fluid communication with the hydrogenation module 70; the hydrogenation module is in fluid communication with the back pressure regulator 80.

The hydrogen compression module 30 comprises a hydrogen compressor 31 and a hydrogen reservoir 32. The supply pressure of hydrogen into the compressor 31 is controlled by a hydrogen pressure regulator 33. The supply pressure of the hydrogen from the reservoir 32 is controlled by a pressure regulator 34. The flow of the hydrogen is controlled by a one-way valve 35.

The hydrogen delivery system 40 comprises a mass flow controller 43, and a one-way valve 44 and is in fluid communication with the hydrogen reservoir 32 and the mixing module 60. The one way valve 44 allows hydrogen gas to flow when the pressure upstream of the valve is greater than the pressure downstream. As described above, it is highly desirable that hydrogen addition is well controlled in order to control the highly exothermic hydrogenation reaction and limit over-reduced impurities.

The liquid delivery module 50 comprises a liquid reservoir 51, a pump 52, and a pulse dampener 53 to provide a constant and stable flow of liquid.

The mixing module 60 comprises a heater 61 and a mixing vessel 62 which can effect mixing. The mixing vessel 62 comprises inert packing material wherein the mean particle diameter of the packing material is less than 100 µm.

The hydrogenation module 70 comprises a packed bed hydrogenation reactor 71 and a heat exchanger 72

The hydrogenation reactor 71 has a packed bed comprising catalyst particles (not shown), wherein the volume mean particle diameter of the catalyst is less than 100 µm. By way of example, the catalyst may be alumina supported platinum wherein the D50 value of the catalyst particles is 70 µm; D10 is 45 µm; D90 is 110 µm.

The hydrogenation module 70 further comprises a pair of thermocouples 73 (not shown) located at the inlet port and outlet port of the hydrogenation reactor 71 to measure the temperature of the liquid composition in use.

The pump 52 pumps the liquid composition comprising the starting compound from the liquid reservoir 51 to the heater 61 where it is heated to a pre-determined mixing temperature, e.g. 200° C. with hydrogen gas delivered via the hydrogen delivery system and transferred to the mixing vessel 62. The mixture of liquid composition and hydrogen is then transferred into the packed bed hydrogenation reactor 71 to effect hydrogenation. The delivery of hydrogen gas is controlled to achieve a predetermined increase in temperature of the liquid composition as a result of hydrogenation e.g from 150° C. to 170° C. as measured by the thermocouples 73 in use. The hydrogenated liquid composition is then transferred to the heat exchanger 72 to effect cooling to a pre-determined temperature, e.g. 40° C. The hydrogenated liquid composition then passes through the back pressure regulator valve 80 before collection The skilled person will appreciate that further hydrogenation reactors may be added to the embodiment described hereinabove. Provided that the process of reacting the partially hydrogenated liquid composition in a further hydrogenation reactor and then cooling in a further heat exchanger is followed, any number of hydrogenation reactors could theoretically be added.

The invention claimed is:

1. A flow-type hydrogenation apparatus for performing hydrogenation, comprising a heat exchanger, a mixing vessel, one or more hydrogenation reactors, a back pressure regulator, a hydrogen source, and a mass flow controller;
the mixing vessel having one or more inlet ports, wherein the or each inlet port is configured to receive therethrough a liquid and/or hydrogen from the hydrogen source, and an outlet port in fluid communication with the one or more hydrogenation reactors, wherein the mixing vessel includes retaining means to control variations in stoichiometry resulting from variations in flow rates of at least one of the liquid and the hydrogen;
the mass flow controller being located downstream of the hydrogen source and upstream of the mixing vessel, wherein the mass flow controller is configured to measure and control the flow of hydrogen to a pre-determined flow rate;
each one or more hydrogenation reactors having an inlet port in fluid communication with the mixing vessel and an outlet port;
each one or more hydrogenation reactors being a packed bed reactor;
wherein the heat exchanger is located downstream of the one or more hydrogenation reactors and upstream of the back pressure regulator, wherein the back pressure regulator is configured to limit and precisely control fluid pressure upstream therefrom.

2. Apparatus according to claim 1 which further comprises a pump located upstream of the mixing vessel to pump the liquid into the mixing vessel via the or one of the inlet ports.

3. Apparatus according to claim 2 wherein the mixing vessel comprises at least one of inert packing material and a heater to effect heating.

4. Apparatus according to claim 3, which further comprises a heater located upstream of the mixing vessel.

5. Apparatus according to claim 4 which further comprises a junction, having two inlet ports and an outlet port, located downstream of the mixing vessel and upstream of the one or more hydrogenation reactors; one inlet port is in fluid communication with the mixing vessel outlet port and the second inlet port is configured to receive a second liquid; the outlet port is in fluid communication with the one or more hydrogenation reactors, optionally wherein the apparatus further comprises a pump located upstream of the junction to pump the second liquid into the junction via the inlet port configured to receive a second liquid, and/or optionally wherein the apparatus further comprises a liquid reservoir in fluid communication with the inlet port configured to receive a second liquid.

6. Apparatus according to claim 5, which further comprises a pre-reactor heat exchanger being located between, and in fluid communication with the outlet port of the mixing vessel and the one or more hydrogenation reactors, optionally wherein the pre-reactor heat exchanger is connected to the one or more hydrogenation reactors via one or more pipes packed with inert material.

7. Apparatus according to claim 6, wherein the or each hydrogenation reactor is at least one of an adiabatic reactor and a liquid-phase hydrogen reactor.

8. Apparatus according to claim 7, wherein the or each hydrogenation reactor has a packed bed comprising catalyst particles, optionally wherein the D50 value of the catalyst particles is less than 100 µm, optionally less than 50 µm, and/or optionally wherein the span is less than 1: or wherein the or each packed bed hydrogenation reactor has a packed bed comprising inert particles, optionally wherein the D50 value of the inert particles is less than 100 µm, optionally less than 50 µm, and/or optionally wherein the span is less than 1.

9. Apparatus according to claim 8, which further comprises a hydrogen compressor.

10. Apparatus according to claim 9, which further comprises temperature sensors located at the inlet port and outlet port of each hydrogenation reactor to measure the temperature of the liquid composition in use.

11. Apparatus according to claim 10, which comprises two or more hydrogenation reactors, each hydrogenation reactor being located between, and in fluid communication with, the outlet port of the mixing vessel and the heat exchanger, optionally wherein the two or more hydrogenation reactors comprise a first hydrogenation reactor and a second hydrogenation reactor and wherein the apparatus comprises a further heat exchanger located between, and in fluid communication with, the first and second hydrogenation reactors.

12. Apparatus according to claim 1 wherein the mass flow controller is configured to control the flow of hydrogen to achieve a pre-determined increase in temperature of the liquid composition as a result of hydrogenation in the one or more packed bed hydrogenation reactors.

13. Apparatus according to claim 12 wherein the mixing vessel is configured to control variations in flow rates of at least one of the liquid and the hydrogen to achieve a constant pre-determined increase in temperature of the liquid due to hydrogenation in the one or more packed bed reactors.

* * * * *